(12) United States Patent
Sato et al.

(10) Patent No.: US 12,166,446 B2
(45) Date of Patent: Dec. 10, 2024

(54) MOTOR DRIVE DEVICE

(71) Applicant: HITACHI ASTEMO, LTD., Hitachinaka (JP)

(72) Inventors: Hiroshi Sato, Hitachinaka (JP); Kohtaro Shiino, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 183 days.

(21) Appl. No.: 17/794,566

(22) PCT Filed: Jan. 22, 2021

(86) PCT No.: PCT/JP2021/002139
§ 371 (c)(1),
(2) Date: Jul. 21, 2022

(87) PCT Pub. No.: WO2021/153433
PCT Pub. Date: Aug. 5, 2021

(65) Prior Publication Data
US 2023/0081701 A1    Mar. 16, 2023

(30) Foreign Application Priority Data
Jan. 31, 2020   (JP) ................................ 2020-014868

(51) Int. Cl.
| H02P 27/00 | (2006.01) |
| H02K 11/25 | (2016.01) |
| H02K 11/33 | (2016.01) |
| H02P 25/22 | (2006.01) |
| H02P 27/08 | (2006.01) |

(Continued)

(52) U.S. Cl.
CPC ............ *H02P 29/028* (2013.01); *H02K 11/25* (2016.01); *H02K 11/33* (2016.01); *H02P 25/22* (2013.01); *H02P 27/08* (2013.01); *B62D 5/0409* (2013.01); *H02K 2211/03* (2013.01); *H02K 2213/06* (2013.01)

(58) Field of Classification Search
CPC ........ H02P 29/028; H02P 25/22; H02P 27/08; H02P 29/024; H02K 11/25; H02K 11/33; H02K 2213/06; B62D 5/0409
See application file for complete search history.

(56) References Cited

U.S. PATENT DOCUMENTS

| 2011/0211284 A1 | 9/2011 | Yoneda |
| 2019/0077449 A1 | 3/2019 | Wada et al. |
| 2019/0372432 A1 | 12/2019 | Kajihara et al. |

FOREIGN PATENT DOCUMENTS

| DE | 102016010442 A1 * | 3/2017 | ........... H02H 7/1225 |
| JP | 2009-254083 A | 10/2009 | |

(Continued)

OTHER PUBLICATIONS

International Search Report dated Mar. 30, 2021 issued in International Application No. PCT/JP2021/002139, with English translation, 5 pages.

(Continued)

*Primary Examiner* — Karen Masih
(74) *Attorney, Agent, or Firm* — FOLEY & LARDNER LLP

(57) ABSTRACT

A heater-integrated fuse is provided at a neutral point of a stator coil, and when a short-circuit failure of an inverter is detected, a fuse part of the heater-integrated fuse is cut by heating.

17 Claims, 10 Drawing Sheets

(51) Int. Cl.
*H02P 29/028* (2016.01)
*B62D 5/04* (2006.01)

(56) References Cited

FOREIGN PATENT DOCUMENTS

| | | | |
|---|---|---|---|
| JP | 2009-259724 A | 11/2009 | |
| JP | 2011-223788 A | 11/2011 | |
| JP | 2014-176215 A | 9/2014 | |
| JP | WO-2017/150639 A1 | 9/2017 | |
| WO | WO-2009144771 A1 * | 12/2009 | ............ H01H 37/54 |
| WO | WO-2018/096596 A1 | 5/2018 | |

OTHER PUBLICATIONS

Written Opinion of the International Searching Authority dated Mar. 30, 2021 issued in International Application No. PCT/JP2021/002139, with English translation, 12 pages.

* cited by examiner

MOTOR DRIVE DEVICE

TECHNICAL FIELD

The present invention relates to a motor drive device.

BACKGROUND ART

In Patent Literature 1, there is disclosed a motor drive device in which a semiconductor relay is provided in a connection circuit for connecting an inverter and a stator coil to each other, for the purpose of suppressing brake torque at the time of a short-circuit failure of the inverter.

CITATION LIST

Patent Literature

PTL 1: JP 2017-150639 A1

SUMMARY OF INVENTION

Technical Problem

However, in the above-mentioned related art, the semiconductor relay has a relatively large resistance value, and hence there has been a fear in that power consumption is increased.

Solution to Problem

One object of the present invention is to provide a motor drive device capable of reducing a power consumption amount.

In a motor drive device according to one embodiment of the present invention, a heater-integrated fuse is provided in a stator coil or a connection circuit for connecting the stator coil and an inverter to each other, and when a short-circuit failure of the inverter is detected, a fuse part of the heater-integrated fuse is cut by heating.

According to one embodiment of the present invention, the power consumption amount can be reduced.

DESCRIPTION OF EMBODIMENTS

First Embodiment

Figure 1:
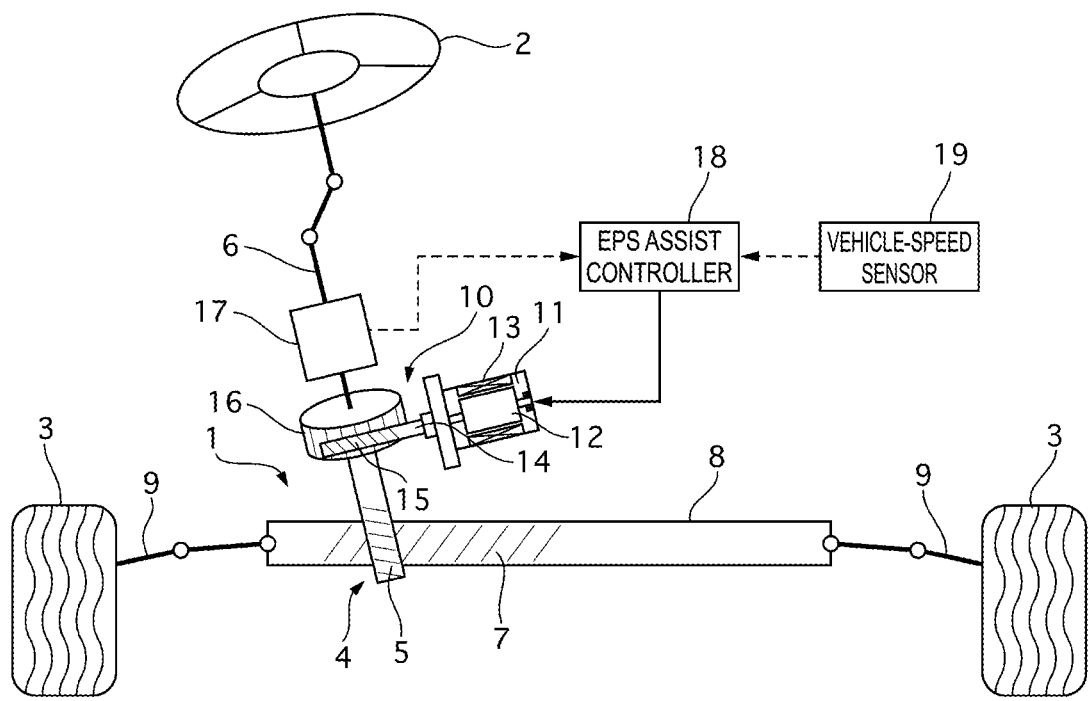
FIG. 1 is a configuration view for illustrating an electric power steering device in a first embodiment.

FIG. 1 is a configuration view for illustrating an electric power steering device according to a first embodiment.

A steering mechanism 1 is configured to turn front wheels 3 and 3 being turning wheels with a rotation of a steering wheel 2 and includes a steering gear 4 of a rack-and-pinion type. A pinion gear 5 of the steering gear 4 is coupled to the steering wheel 2 through intermediation of a steering shaft 6. A rack gear 7 of the steering gear 4 is provided on a rack shaft 8 that extends in a vehicle width direction. Both ends of the rack shaft 8 are coupled to the front wheels 3 and 3 through intermediation of tie rods 9 and 9. A three-phase brushless DC motor (which is a motor unit and is hereinafter referred to as "motor") 11 is coupled to the steering shaft 6 through intermediation of a speed reducer 10.

The motor 11 includes a motor rotor 12 and a stator coil 13. The motor rotor 12 is a magnet, and is provided integrally with a motor shaft 14. Details of the stator coil 13 are described later. The speed reducer 10 includes a worm shaft 15 and a worm wheel 16. The worm shaft 15 is provided integrally with the motor shaft 14. Rotation torque from the motor shaft 14 is transmitted to the steering shaft 6 via the speed reducer 10. A torque sensor 17 for detecting steering torque is provided on the steering shaft 6. An EPS assist controller 18 controls a drive current of the motor 11 based on the steering torque detected by the torque sensor 17 and a vehicle speed detected by a vehicle-speed sensor 19, to thereby apply a steering force for assisting driver's steering to the steering mechanism 1.

Figure 2:
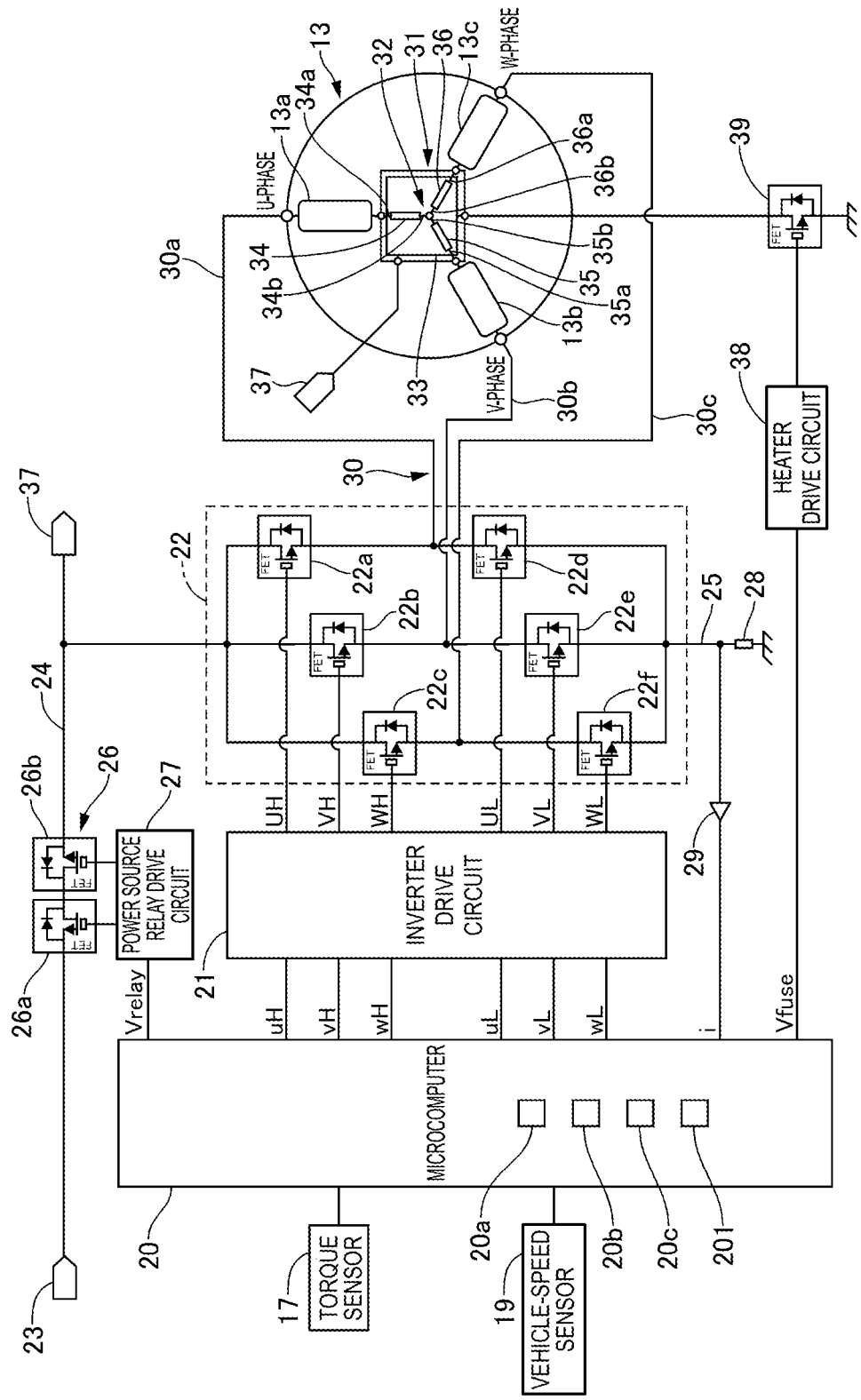
FIG. 2 is a circuit configuration diagram for illustrating a motor drive device according to the first embodiment.

FIG. 2 is a circuit configuration diagram for illustrating a motor drive device according to the first embodiment.

The EPS assist controller 18 includes, as the motor drive device, a microcomputer 20, an inverter drive circuit 21, and an inverter 22.

In order to obtain output of the motor 11 corresponding to the steering torque and the vehicle speed, a motor drive command signal generation unit 201 of the microcomputer 20 outputs, based on a PWM control law, to the inverter drive circuit 21, motor drive command signals (switching signals) uH, vH, wH, uL, vL, and wL for controlling drive of field effect transistors (FETs) 22a to 22f of the inverter 22, respectively.

The inverter drive circuit 21 is a pre-driver, and outputs signals UH, VH, WH, UL, VL, and WL obtained by amplifying the motor drive command signals uH, vH, wH, uL, vL, and wL output from the microcomputer 20, to the FETs 22a to 22f of the inverter 22, respectively.

The inverter 22 is a bridge circuit including six FETs 22a to 22f. The FETs 22a to 22f operate in accordance with the motor drive command signals UH, VH, WH, UL, VL, and WL amplified by the inverter drive circuit 21, respectively, and apply voltages to the stator coil 13 of the motor 11. The upper arms 22a to 22c are connected to a battery 23 by a power source line 24. The lower arms 22d to 22f are connected to a ground line 25. A power source relay 26 is provided on the power source line 24. The power source relay 26 includes two FETs 26a and 26b. A power source relay control unit 20a of the microcomputer 20 outputs a relay drive command signal Vrelay for controlling drive of each of the FETs 26a and 26b, to a power source relay drive circuit 27. The power source relay drive circuit 27 is a pre-driver, and amplifies the relay drive command signal Vrelay output from the microcomputer 20 to output the amplified relay drive command signal Vrelay to each of the FETs 26a and 26b. A current sensor (shunt resistor) 28 is provided on the ground line 25. The current sensor 28 detects a phase current (current value of each of a u-phase, a v-phase, and a w-phase) of the stator coil 13. An output signal "i" of the current sensor 28 is amplified by a current sensor amplifier 29 so as to be input to the microcomputer 20.

The stator coil 13 includes coils 13a, 13b, and 13c of respective phases (u-phase, v-phase, and w-phase) connected in star connection. The stator coil 13 drives the motor rotor 12 to rotate in accordance with the voltage applied to each phase. The inverter 22 and the stator coil 13 are connected to each other via a connection circuit 30. The connection circuit 30 is three conductive wires extending from the stator coil 13 in a direction of a rotation axis of the motor rotor 12. A u-phase conductive wire 30a connects the first transistor 22a and the second transistor 22d which are connected in series to each other to the u-phase coil 13a. A v-phase conductive wire 30b connects the third transistor 22b and the fourth transistor 22e which are connected in series to each other to the v-phase coil 13b. A w-phase conductive wire 30c connects the fifth transistor 22c and the sixth transistor 22f which are connected in series to each other to the w-phase coil 13c.

The motor drive device according to the first embodiment includes a heater-integrated fuse 31 for the purpose of suppressing brake torque at the time of a short-circuit failure of the inverter 22. The short-circuit failure is a failure in which a short circuit between a source and a drain occurs in any of the FETs forming the inverter.

The heater-integrated fuse 31 is mounted on a glass epoxy substrate (not shown). The glass epoxy substrate is obtained by bonding copper foil to a plate member obtained by soaking fabric made of glass fibers into an epoxy resin and subjecting a resultant material to thermosetting processing, and is generally used as a material of a printed board. The heater-integrated fuse 31 includes a fuse part 32 and a heater part 33 for generating heat for use in cutting (fusing) the fuse part 32.

The fuse part 32 includes a first fuse part 34, a second fuse part 35, and a third fuse part 36. A first end portion 34a of the first fuse part 34 is connected to the u-phase coil 13a. A first end portion 35a of the second fuse part 35 is connected to the v-phase coil 13b. A first end portion 36a of the third fuse part 36 is connected to the w-phase coil 13c. A second end portion 34b of the first fuse part 34, a second end portion 35b of the second fuse part 35, and a second end portion 36b of the third fuse part 36 are connected to each other. That is, the heater-integrated fuse 31 in the first embodiment is connected to a neutral point of the stator coil 13.

The heater part 33 generates heat through use of power supplied from a fuse heating power source (heater power supply unit) 37, and thus can cut the fuse part 32 (first fuse part 34, second fuse part 35, and third fuse part 36) through heat generation. The fuse heating power source 37 connects the heater part 33 and a part of the power source line 24 between the power source relay 26 and the inverter so as to supply power from the battery 23 to the heater part 33.

The microcomputer 20 includes, in addition to the motor drive command signal generation unit 201 and the power source relay control unit 20a, a failure detection unit 20b and a heater control unit 20c.

The failure detection unit 20b detects the short-circuit failure of the inverter 22 based on a change in a current (phase current) of each of the u-phase, the v-phase, and the w-phase of the stator coil 13, which is detected by the current sensor 28. Specifically, the failure detection unit 20b detects the short-circuit failure of the inverter 22 when the phase current of the stator coil 13 is equal to or larger than a predetermined value that can be determined as overcurrent.

When the failure detection unit 20b detects the short-circuit failure of the inverter 22, the heater control unit 20c outputs a heater energization command signal Vfuse for controlling drive of an FET 39, to a heater drive circuit 38. The heater drive circuit 38 is a pre-driver, and amplifies the heater energization command signal Vfuse output from the microcomputer 20 to output the amplified heater energization command signal Vfuse to the FET 39. When the heater energization command signal Vfuse is input to the FET 39, power is supplied from the fuse heating power source 37 to the heater part 33.

After the heater control unit 20c outputs the heater energization command signal Vfuse, the power source relay control unit 20a switches the power source relay 26 to an interruption state so that conduction between the battery 23 and the inverter 22 is interrupted.

Next, actions and effects of the first embodiment are described.

When the short-circuit failure occurs in the inverter for driving the three-phase brushless DC motor, supply of power to the motor is stopped and the operation transitions to manual steering. At this time, a closed circuit including the stator coil of the failed phase is formed between the inverter and a motor winding, and hence a counter-electromotive force is generated in the stator coil of the failed phase when the driver operates the steering wheel so that the motor is rotated. This counter-electromotive force causes brake torque that hinders the motion of the steering wheel to be generated on the motor shaft, and thus the steering of the steering wheel becomes heavy.

In the related-art motor drive device, when the short-circuit failure of the inverter is detected, a semiconductor relay provided in the connection circuit for connecting the inverter and the stator coil to each other is brought into an interruption state. In this manner, formation of the closed circuit including the motor winding of the failed phase is avoided, and generation of the brake torque is suppressed. However, the semiconductor relay has a relatively large resistance value, and hence its power loss causes reduction in efficiency of the motor.

In contrast, in the motor drive device according to the first embodiment, when the short-circuit failure of the inverter 22 is detected, the heater part 33 of the heater-integrated fuse 31 is heated so that the fuse part 32 is cut. Through use of the heater-integrated fuse 31 as a relay for interrupting the closed circuit, as compared to a case in which the semiconductor relay or relays of other electronic components are used, the resistance value can be decreased, and hence the power consumption amount can be reduced.

The heater-integrated fuse 31 is connected to the neutral point of the stator coil 13. The heater-integrated fuse 31 can be easily arranged by providing the heater-integrated fuse 31 at a portion at which the coils 13a, 13b, and 13c of the respective phases (u-phase, v-phase, and w-phase) are concentrated at one location.

The fuse part 32 of the heater-integrated fuse 31 includes the first fuse part 34, the second fuse part 35, and the third fuse part 36. The first end portions 34a to 36a of the respective fuse parts 34 to 36 are connected to the coils 13a to 13c of the corresponding phases, and the second end portions 34b to 36b thereof are connected to each other. In this manner, the fuse parts 34 to 36 corresponding to the three phases can be cut by one heater part 33.

The failure detection unit 20b of the microcomputer 20 detects the short-circuit failure of the inverter 22 based on a change in a current of each of the u-phase, the v-phase, and the w-phase of the stator coil 13. When the short-circuit failure occurs in any of the FETs 22a to 22f of the inverter 22, the phase current of the corresponding stator coil 13 rises. Thus, the short-circuit failure of the FETs 22a to 22f can be detected by detecting the rise of the phase current of the stator coil 13.

The heater-integrated fuse 31 is mounted on the glass epoxy substrate. The glass epoxy substrate has a relatively low thermal conductivity. Thus, as compared to a case in which the heater-integrated fuse 31 is mounted on a metal matrix substrate such as an aluminum alloy, heat generated by the heater part 33 is less liable to escape to the substrate, and a cutting time of the fuse parts 34 to 36 can be shortened.

After the heater control unit 20c outputs the heater energization command signal Vfuse, the power source relay control unit 20a of the microcomputer 20 switches the power source relay 26 to the interruption state so that the conduction between the battery 23 and the inverter 22 is interrupted. In this manner, even at the time of such a secondary failure that the heater-integrated fuse 31 does not normally operate, flowing of a through-current through the motor 11 can be suppressed.

Second Embodiment

A basic configuration of a second embodiment is the same as that of the first embodiment, and hence only parts different from those of the first embodiment are described.

Figure 3:
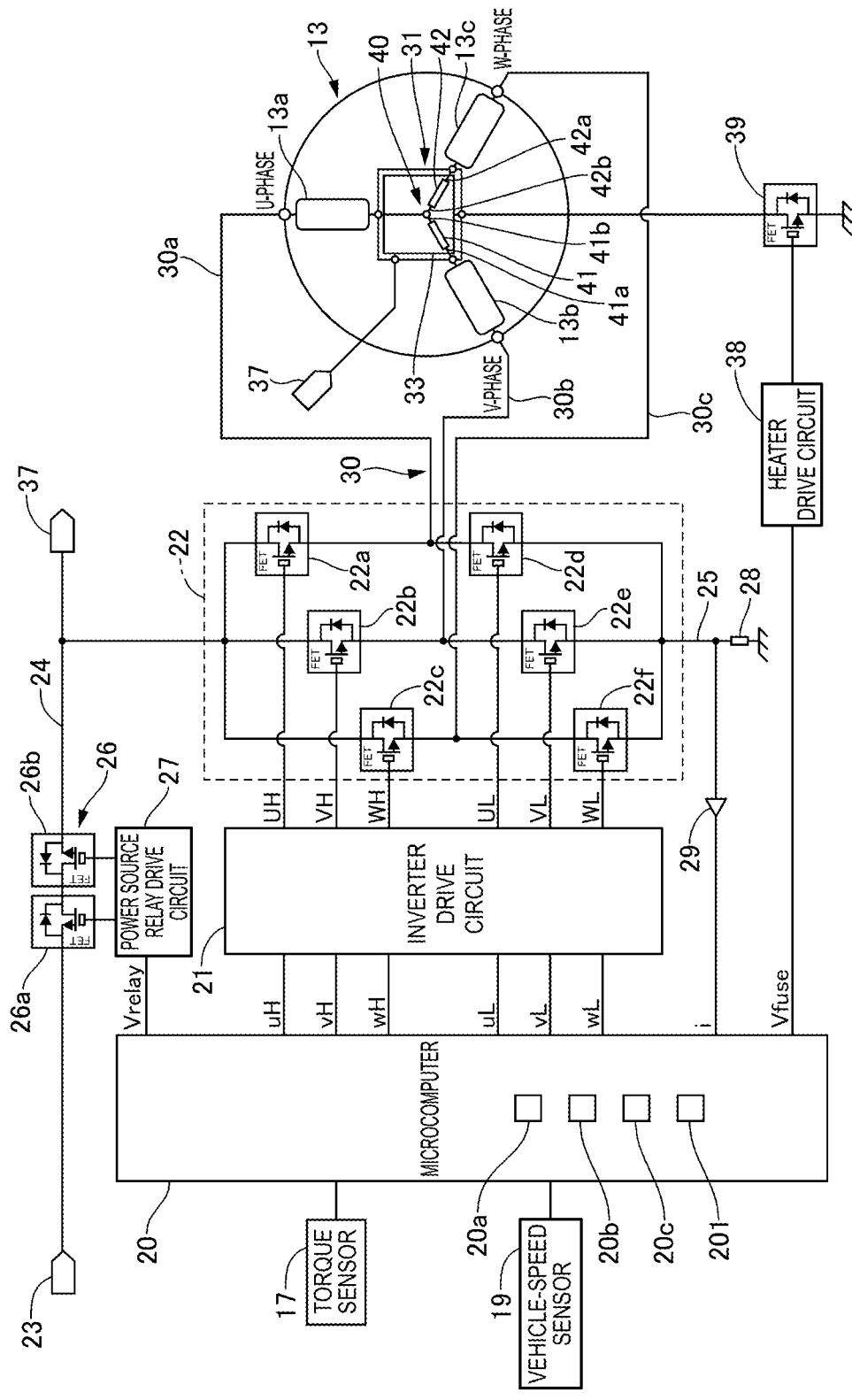
FIG. 3 is a circuit configuration diagram for illustrating a motor drive device according to a second embodiment.

FIG. 3 is a circuit configuration diagram for illustrating a motor drive device according to the second embodiment.

A fuse part 40 of the heater-integrated fuse 31 includes a first fuse part 41 and a second fuse part 42. A first end portion 41a of the first fuse part 41 is connected to the v-phase coil 13b. A first end portion 42a of the second fuse part 42 is connected to the w-phase coil 13c. A second end portion 41b of the first fuse part 41, a second end portion 42b of the second fuse part 42, and an end portion of the u-phase coil 13c on an opposite side of the u-phase conductive wire 30a side are connected to each other.

Next, actions and effects of the second embodiment are described.

In the second embodiment, the first fuse part 41 and the second fuse part 42 are provided for two phases (v-phase and w-phase) of the three phases, and hence the brake torque at the time of the short-circuit failure of the inverter 22 can be suppressed. Further, as compared to a case in which the fuse parts are provided for all of the three phases, the device is simplified and thus the cost can be reduced.

Third Embodiment

A basic configuration of a third embodiment is the same as that of the first embodiment, and hence only parts different from those of the first embodiment are described.

Figure 4:
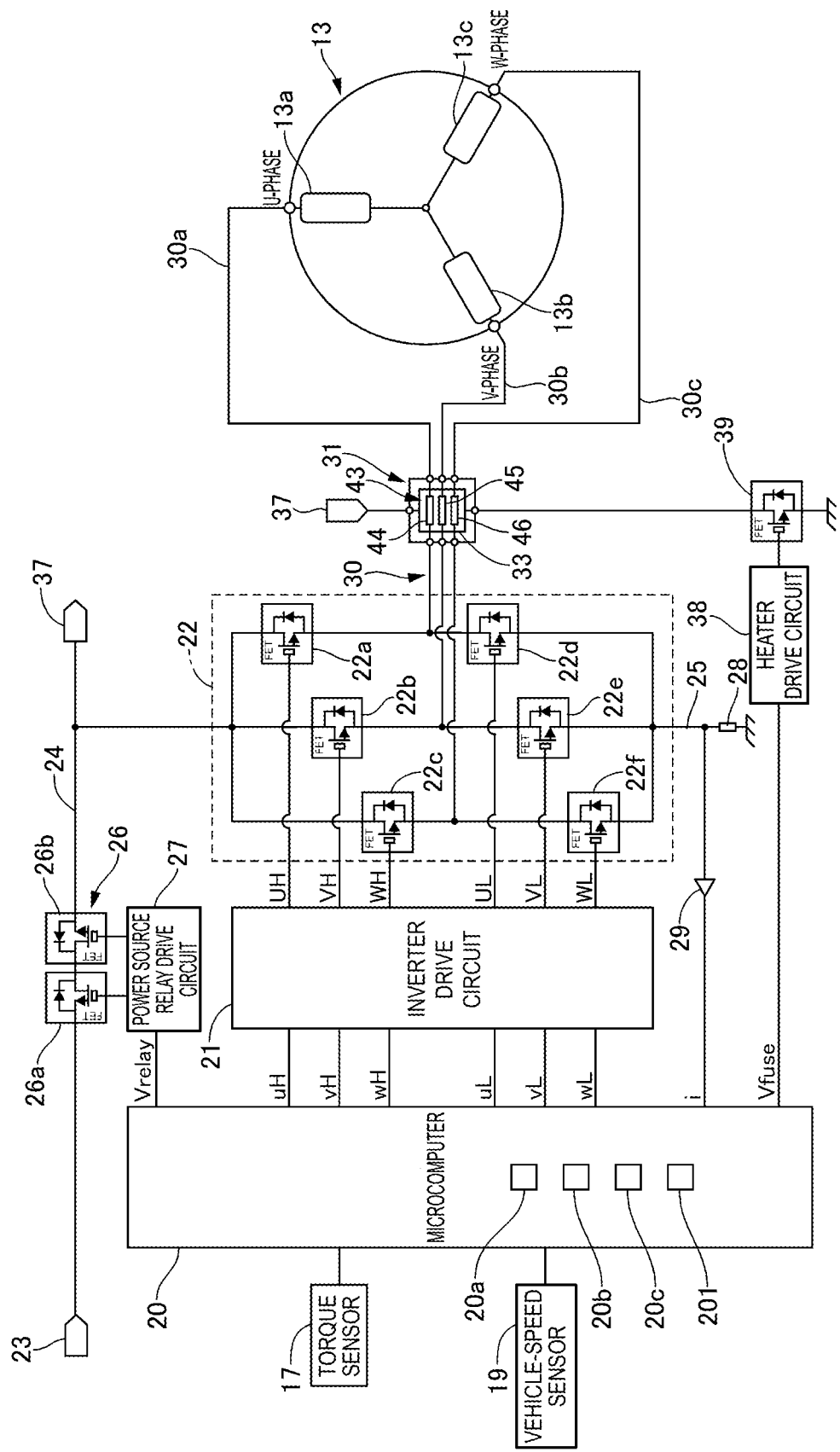
FIG. 4 is a circuit configuration diagram for illustrating a motor drive device according to a third embodiment.

FIG. 4 is a circuit configuration diagram for illustrating a motor drive device according to the third embodiment.

A fuse part 43 of the heater-integrated fuse 31 includes a first fuse part 44, a second fuse part 45, and a third fuse part 46. The first fuse part 44 is connected in series to the u-phase conductive wire 30a. The second fuse part 45 is connected in series to the v-phase conductive wire 30b. The third fuse part 46 is connected in series to the w-phase conductive wire 30c.

The heater part 33 generates heat through use of power supplied from the fuse heating power source 37, and thus can cut the fuse part 43 (first fuse part 44, second fuse part 45, and third fuse part 46) through heat generation.

As illustrated in FIG. 4, in the direction of the rotation axis of the motor rotor 12, the microcomputer 20, the conductive wires 30a to 30c, and the motor 11 are arranged in series to each other in the stated order.

Next, actions and effects of the third embodiment are described.

In the third embodiment, the fuse part 43 is provided on the three conductive wires 30a to 30c. In this case, in a case in which the connection circuit 30 is extended in the direction of the rotation axis of the motor rotor 12 from the stator coil 13 in order to connect the stator coil 13 and a power supply circuit including the inverter 22 to each other, when the fuse part 43 is provided in this part, as compared to a case in which the fuse part is provided in the stator coil 13 itself, the layout performance of the fuse part 43 can be improved. Further, the fuse part 43 is provided at a location at which the three conductive wires 30a to 30c can be easily collected, and hence the fuse parts 44 to 46 corresponding to the three phases can be cut by one heater part 33.

In the direction of the rotation axis of the motor rotor 12, the microcomputer 20, the conductive wires 30a to 30c, and the motor 11 are arranged in series to each other in the stated order. That is, the fuse part 43 provided on the conductive wires 30a to 30c is provided at a position closer to the microcomputer 20 with respect to the stator coil 13, and hence the heater part 33 for cutting the fuse part 43 is also arranged closer to the microcomputer 20. As a result, the power source line for connecting the fuse heating power source 37 and the heater part 33 to each other can be easily wired.

Fourth Embodiment

A basic configuration of a fourth embodiment is the same as that of the third embodiment, and hence only parts different from those of the first embodiment are described.

Figure 5:
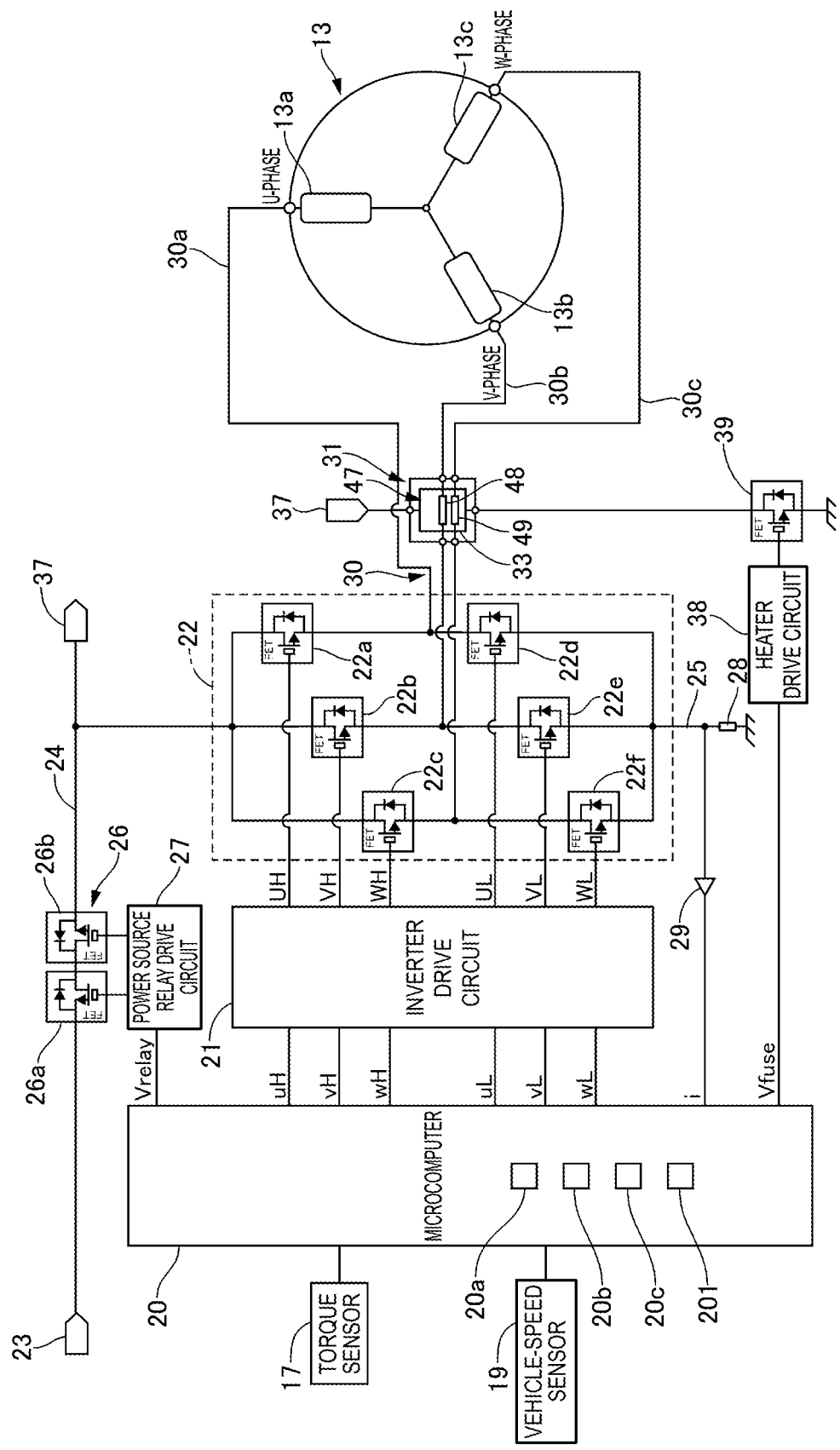
FIG. 5 is a circuit configuration diagram for illustrating a motor drive device according to a fourth embodiment.

FIG. 5 is a circuit configuration diagram for illustrating a motor drive device according to the fourth embodiment.

A fuse part 47 of the heater-integrated fuse 31 includes a first fuse part 48 and a second fuse part 49. The first fuse part 48 is connected in series to the v-phase conductive wire 30b. The second fuse part 49 is connected in series to the w-phase conductive wire 30c.

Next, actions and effects of the fourth embodiment are described.

In the fourth embodiment, the first fuse part 48 and the second fuse part 49 are provided for two phases (v-phase and w-phase) of the three phases, and hence the brake torque at the time of the short-circuit failure of the inverter 22 can be suppressed. Further, as compared to the case in which the fuse parts are provided for all of the three phases, the device is simplified and thus the cost can be reduced.

Fifth Embodiment

A basic configuration of a fifth embodiment is the same as that of the first embodiment, and hence only parts different from those of the first embodiment are described.

Figure 6:
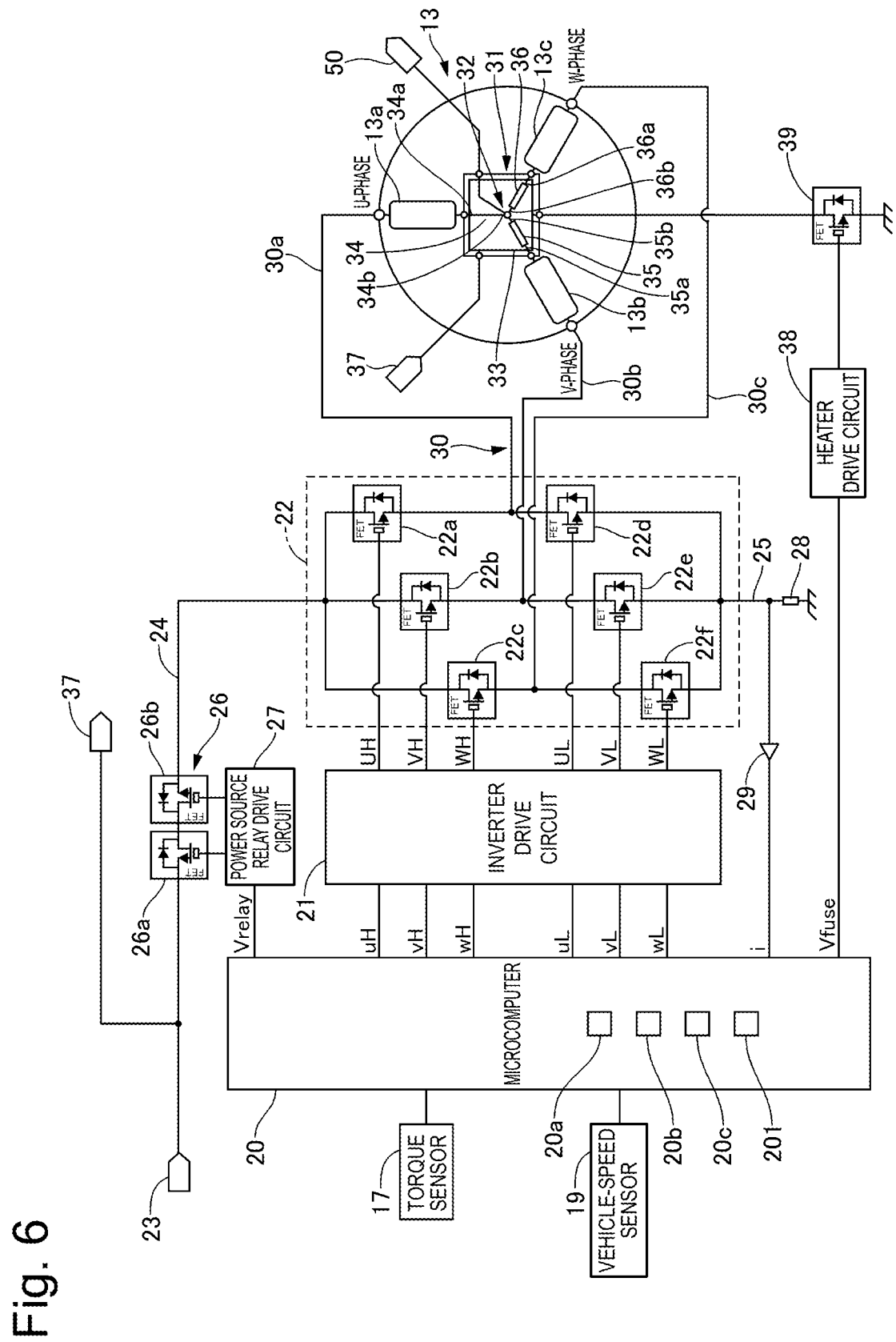
FIG. 6 is a circuit configuration diagram for illustrating a motor drive device according to a fifth embodiment.

FIG. 6 is a circuit configuration diagram for illustrating a motor drive device according to the fifth embodiment.

A voltage sensor 50 detects a voltage at the neutral point of the stator coil 13 to output the detected voltage to the microcomputer 20.

The failure detection unit 20b of the microcomputer 20 detects the short-circuit failure of the inverter 22 based on a change in a voltage at the neutral point of the stator coil 13.

In the fifth embodiment, the fuse heating power source 37 connects the heater part 33 and a part of the power source line 24 between the battery 23 and the power source relay 26 to each other.

Next, actions and effects of the fifth embodiment are described.

When the short-circuit failure occurs in any of the upper arms 22a to 22c among the six FETs 22a to 22f which are connected in bridge connection of the inverter 22, the voltage at the neutral point of the stator coil 13 rises. Thus, the short-circuit failure of the FETs 22a to 22c can be detected by detecting this rise of the voltage at the neutral point. Further, after the fuse parts 34 to 36 are cut, the voltage at the neutral point becomes 0. Accordingly, it can be confirmed that the fuse parts 34 to 36 are operated (cut) by detecting this change.

When the fuse heating power source 37 is set on the battery 23 side with respect to the power source relay 26 in the power source line 24, even in a case in which the power source relay 26 is erroneously brought into the interruption state, power can be supplied to the heater part 33.

Sixth Embodiment

A basic configuration of a sixth embodiment is the same as that of the first embodiment, and hence only parts different from those of the first embodiment are described.

Figure 7:
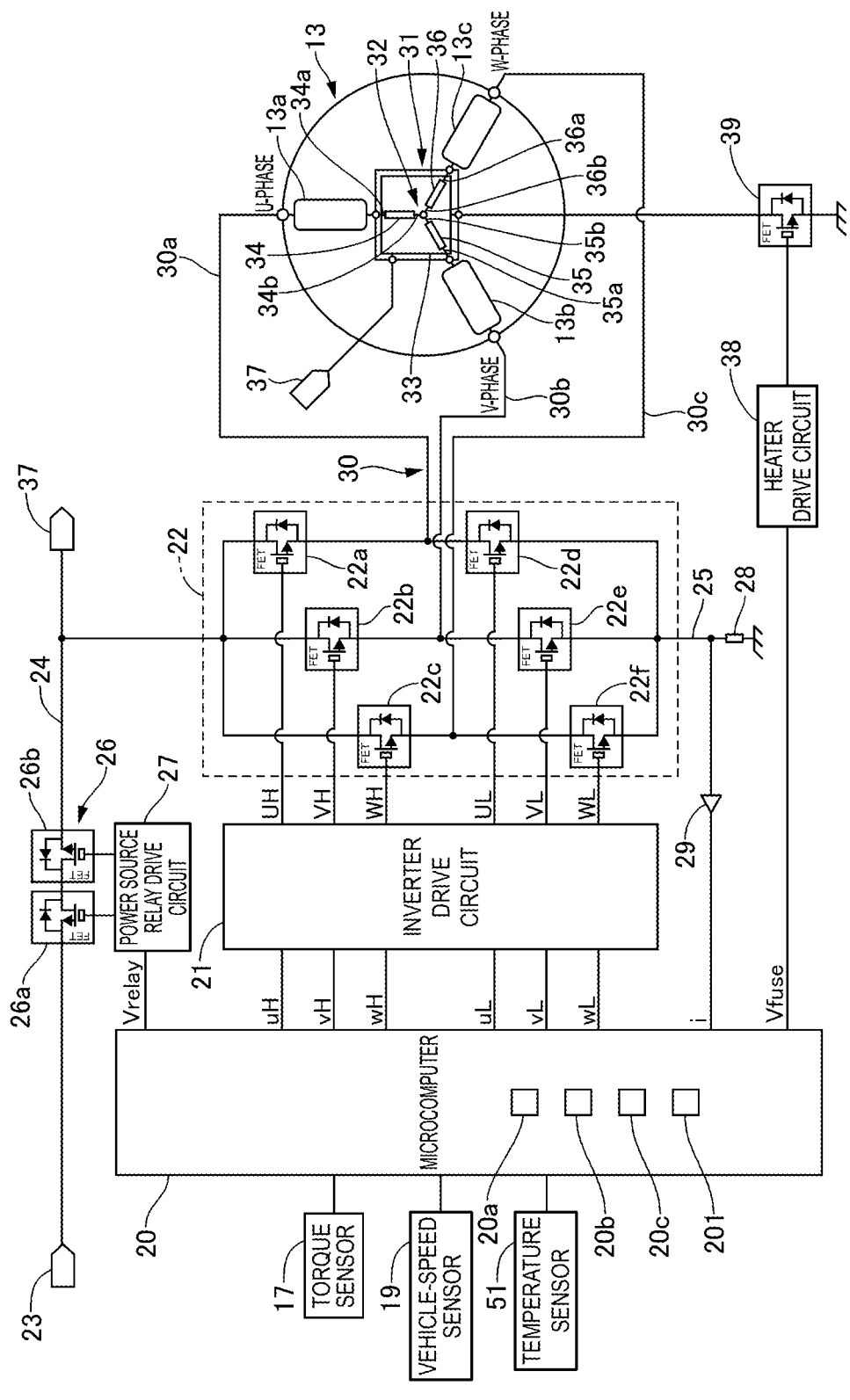
FIG. 7 is a circuit configuration diagram for illustrating a motor drive device according to a sixth embodiment.

FIG. 7 is a circuit configuration diagram for illustrating a motor drive device according to the sixth embodiment.

A temperature sensor 51 detects a temperature inside of an ECU cover (not shown) to output the detected temperature to the microcomputer 20. The ECU cover is fixed to a motor housing (not shown) accommodating the motor rotor 12 and the stator coil 13. Inside of the ECU cover, a substrate having the microcomputer 20 mounted thereon, the inverter 22, and the like are accommodated. For example, the temperature sensor 51 is provided on the substrate.

When the failure detection unit 20b does not detect the short-circuit failure of the inverter 22 and also when the temperature inside of the cover detected by the temperature sensor 51 (atmospheric temperature at a location at which the microcomputer 20 is provided) is lower than a predetermined temperature, the heater control unit 20c supplies power to the heater part 33 within a range in which the fuse part 32 is not cut, to thereby execute pre-heat control of heating the heater part 33.

Further, when the failure detection unit 20b detects the short-circuit failure of the inverter 22 and when the temperature inside of the ECU cover detected by the temperature sensor 51 is lower than the predetermined temperature, the heater control unit 20c outputs a heater energization command signal (second heater energization command signal) Vfuse different from the heater energization command signal (first heater energization command signal) Vfuse output at the time of the predetermined temperature or higher in order to supply power larger than that at the time of the predetermined temperature or higher to the heater part 33.

Next, actions and effects of the sixth embodiment are described.

In order to suppress the brake torque at the time of the short-circuit failure of the inverter 22, when the short-circuit failure of the inverter 22 is detected, it is required to cut the fuse part 32 in as short a time as possible. In view of this, in the sixth embodiment, when the atmospheric temperature at the location at which the microcomputer 20 is provided is lower than the predetermined temperature, that is, at the time of a low temperature state, the fuse part 32 can be pre-heated so that the fuse part 32 can be cut in a short period of time when the short-circuit failure of the inverter 22 is detected. Further, when the short-circuit failure of the inverter 22 is detected under the low temperature state, power higher than that to be supplied when the short-circuit failure of the inverter 22 is detected under a non-low-temperature state is supplied to the heater part 33. In this manner, the fuse part 32 can be cut in a short period of time at the time of the short-circuit failure of the inverter 22.

Seventh Embodiment

A basic configuration of a seventh embodiment is the same as that of the first embodiment, and hence only parts different from those of the first embodiment are described.

Figure 8:
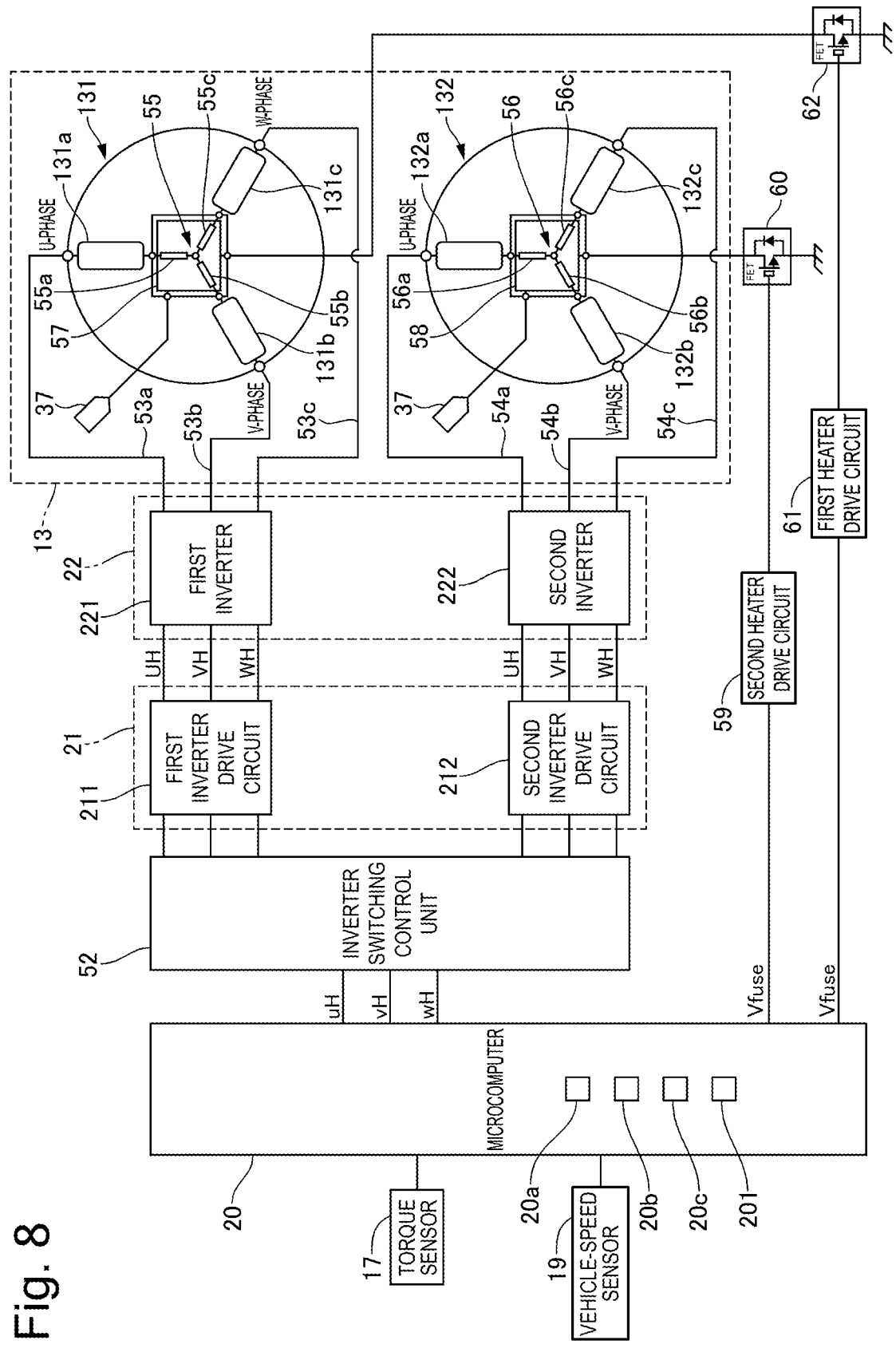
FIG. 8 is a circuit configuration diagram for illustrating a motor drive device according to a seventh embodiment.

FIG. 8 is a circuit configuration diagram for illustrating a motor drive device according to the seventh embodiment.

In the motor drive circuit according to the seventh embodiment, the inverter drive circuit 21, the inverter 22, and the stator coil 13 are made redundant.

An inverter switching control unit 52 receives as input the motor drive command signals uH, vH, wH, uL, vL, and wL and an inverter switching control signal output from the microcomputer 20, and outputs the motor drive command signals uH, vH, wH, uL, vL, and wL to one or both of a first inverter unit 221 and a second inverter unit 222 in accordance with information obtained from the inverter switching control signal. The inverter switching control signal is a signal including information on whether or not to output the motor drive command signal to the first inverter unit 221 and whether or not to output the motor drive command signal to the second inverter unit 222.

An inverter switching signal generation unit 20d of the microcomputer 20 generates the inverter switching control signal in accordance with whether or not both of the inverter units 221 and 222 are normal. For example, the inverter switching signal generation unit 20d generates the inverter switching control signal so that the motor drive command signals uH, vH, wH, uL, vL, and wL are output to a normal inverter unit of the two inverter units 221 and 222 and the motor drive command signals uH, vH, wH, uL, vL, and wL are prevented from being output to an inverter unit in which an abnormality has occurred.

A first inverter drive circuit 211 outputs signals UH, VH, WH, UL, VL, and WL obtained by amplifying the motor drive command signals uH, vH, wH, uL, vL, and wL output from the inverter switching control unit 52, to the first inverter unit 221. A second inverter drive circuit 212 outputs signals UH, VH, WH, UL, VL, and WL obtained by amplifying the motor drive command signals uH, vH, wH, uL, vL, and wL output from the inverter switching control unit 52, to the second inverter unit 222.

The first inverter unit 221 operates in accordance with the motor drive command signals uH, vH, wH, uL, vL, and wL amplified by the first inverter drive circuit 211, and applies voltages to a first stator coil 131. The second inverter unit 222 operates in accordance with the motor drive command signals uH, vH, wH, uL, vL, and wL amplified by the second inverter drive circuit 212, and applies voltages to a second stator coil 132. Similarly to the first embodiment, each of the first inverter unit 221 and the second inverter unit 222 is a bridge circuit including six FETs. Although not shown, the upper arms of each of the two inverter units 221 and 222 are connected to the battery 23 by the power source line 24. The lower arms of each of the two inverter units 221 and 222 are connected to the ground line 25. The current sensor 28 is provided on each of the two ground lines 25 and 25.

The first stator coil 131 includes coils 131a, 131b, and 131c of respective phases (first u-phase, first v-phase, and first w-phase) connected in star connection. The first inverter unit 221 and the first stator coil 131 are connected to each other via a connection circuit 53. A first u-phase conductive wire 53a of the connection circuit 53 is connected to the first u-phase coil 131a. Similarly, a first v-phase conductive wire 53b is connected to the first v-phase coil 131b, and a first w-phase conductive wire 53c is connected to the first w-phase coil 131c.

The second stator coil 132 includes coils 132a, 132b, and 132c of respective phases (second u-phase, second v-phase, and second w-phase) connected in star connection. The second inverter unit 222 and the second stator coil 132 are connected to each other via a connection circuit 54. A second u-phase conductive wire 54a of the connection circuit 54 is connected to the second u-phase coil 132a. Similarly, a second v-phase conductive wire 54b is connected to the second v-phase coil 132b, and a second w-phase conductive wire 54c is connected to the second w-phase coil 132c.

The first stator coil 131 and the second stator coil 132 are accommodated in one casing (motor housing), and drive the common motor rotor 12 to rotate.

The heater-integrated fuse 31 includes, as the fuse part, a first fuse part 55a, a second fuse part 55b, a third fuse part 55c, a fourth fuse part 56a, a fifth fuse part 56b, and a sixth fuse part 56c.

A first end portion of the first fuse part 55a is connected to the first u-phase conductive wire 53a. A first end portion of the second fuse part 55b is connected to the first v-phase conductive wire 53b. A first end portion of the third fuse part 55c is connected to the first w-phase conductive wire 53c. Second end portions of the first fuse part 55a, the second fuse part 55b, and the third fuse part 55c are connected to each other.

A first end portion of the fourth fuse part 56a is connected to the second u-phase conductive wire 54a. A first end portion of the fifth fuse part 56b is connected to the second v-phase conductive wire 54b. A first end portion of the sixth fuse part 56c is connected to the second w-phase conductive wire 54c. Second end portions of the fourth fuse part 56a, the fifth fuse part 56b, and the sixth fuse part 56c are connected to each other.

The heater-integrated fuse 31 includes a first heater part 57 and a second heater part 58. The first heater part 57 generates heat through use of power supplied from the fuse heating power source 37, and thus can cut the first fuse part 55a, the second fuse part 55b, and the third fuse part 55c through heat generation. Similarly, the second heater part 58 generates heat through use of power supplied from the fuse heating power source 37, and thus can cut the fourth fuse part 56a, the fifth fuse part 56b, and the sixth fuse part 56c through heat generation.

The failure detection unit 20b of the microcomputer 20 detects the short-circuit failure of the first inverter unit 221 based on a change in a current of each of the first u-phase, the first v-phase, and the first w-phase of the first stator coil 131 detected by the current sensor 28, and also detects the short-circuit failure of the second inverter unit 222 based on a change in a current of each of the second u-phase, the second v-phase, and the second w-phase of the second stator coil 132 detected by the current sensor 28.

When the failure detection unit 20b detects the short-circuit failure of the first inverter unit 221, the heater control unit 20c outputs the heater energization command signal Vfuse for controlling drive of an FET 62 to a first heater drive circuit 61. The first heater drive circuit 61 amplifies the heater energization command signal Vfuse output from the microcomputer 20 to output the amplified heater energization command signal Vfuse to the FET 62. When the heater energization command signal Vfuse is input to the FET 62, power is supplied from the fuse heating power source 37 to the first heater part 57. The same holds true also when the failure detection unit 20b detects the short-circuit failure of the second inverter unit 222. After the heater energization command signal Vfuse output from the microcomputer 20 is amplified by a second heater drive circuit 59, the amplified heater energization command signal Vfuse is input to an FET 60 so that power is supplied from the fuse heating power source 37 to the second heater part 58.

Figure 9:
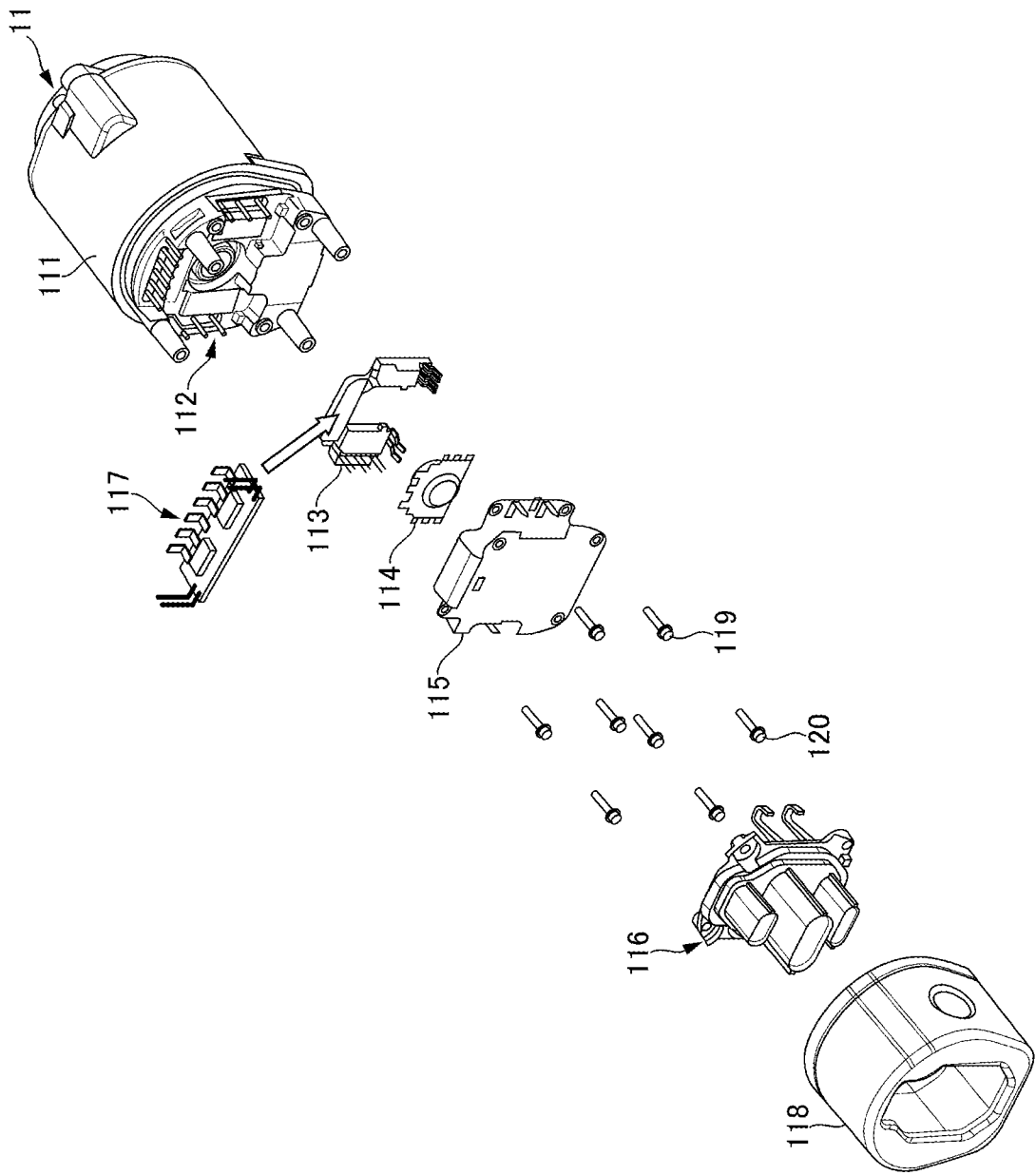
FIG. 9 is an exploded perspective view for illustrating the motor drive device according to the seventh embodiment.
Figure 10:
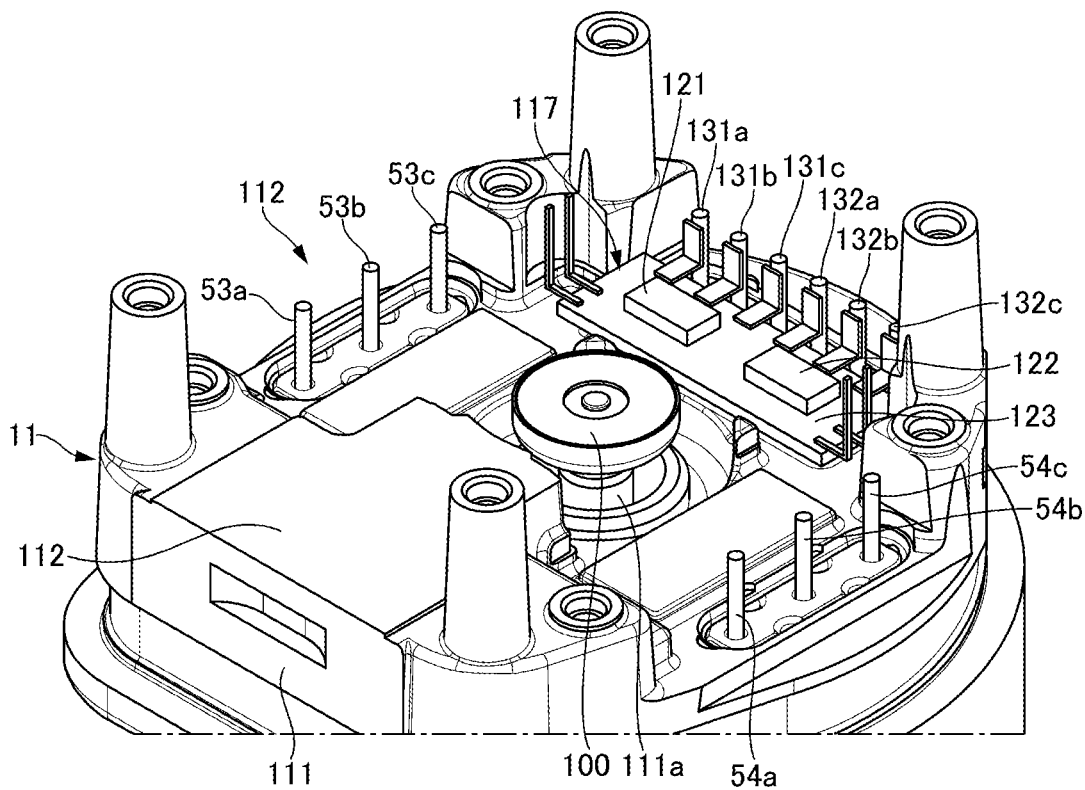
FIG. 10 is a perspective view for illustrating a state in which, in the motor drive device according to the seventh embodiment, a fuse module 117 is mounted on an ECU mounting surface 112 of a motor housing 111.
Figure 11:
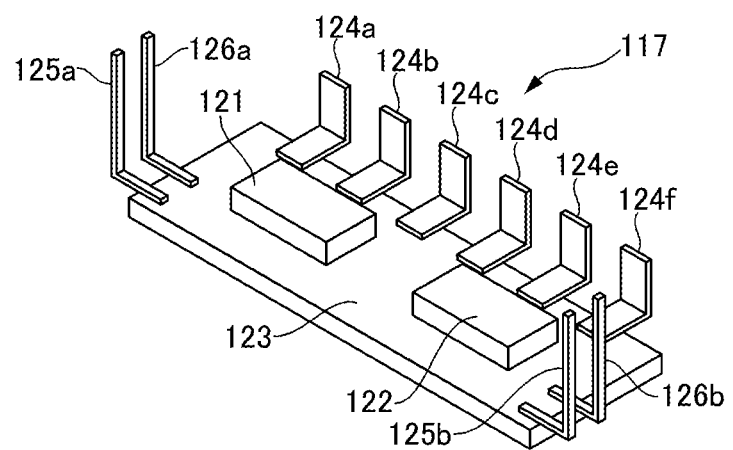
FIG. 11 is a perspective view for illustrating the fuse module 117 in the seventh embodiment.

FIG. 9 is an exploded perspective view for illustrating the motor drive device according to the seventh embodiment. FIG. 10 is a perspective view for illustrating a state in which, in the motor drive device according to the seventh embodiment, a fuse module 117 is mounted on an ECU mounting surface 112 of a motor housing 111. FIG. 11 is a perspective view for illustrating the fuse module 117 in the seventh embodiment.

Inside of the motor housing 111, a motor shaft 111a, the motor rotor 12, and the stator coil 13 (first stator coil 131 and second stator coil 132) are accommodated. The ECU mounting surface 112 is formed on an end surface of the motor housing 111 on one side in the direction of the rotation axis of the motor rotor 12. Six conductive wires 53a to 53c and 54a to 54c and six coils 131a to 131c and 132a to 132c project from the ECU mounting surface 112. The ECU mounting surface 112 is covered with an ECU cover 118 under a state in which an inverter module 113, a magnet cover 114, an ECU substrate 115, a connector 116, and the fuse module 117 are mounted on the ECU mounting surface 112.

The inverter module 113 is a substrate having the first inverter drive circuit 211, the second inverter drive circuit 212, the first inverter unit 221, and the second inverter unit 222 mounted thereon, and is fastened to the ECU mounting surface 112 by four screws 119. The inverter module 113 is connected to the six conductive wires 53a to 53c and 54a to 54c. The magnet cover 114 covers a magnet 100 of a resolver fixed to the end portion of the motor shaft 111a. The ECU substrate 115 has the microcomputer 20 and the inverter switching control unit 52 mounted thereon. The ECU substrate 115 is fastened to the ECU mounting surface 112 by four screws 120.

The connector 116 is connected to the power source line 24 so as to supply power to the ECU substrate 115 or the like. Further, the connector 116 is connected to a signal line for inputting an output signal of the torque sensor 17 and information (vehicle speed or the like) related to a traveling state of the vehicle. The power and the signal input to the connector 116 are input to the ECU substrate 115 via a bus bar (not shown).

The fuse module 117 has a first fuse element 121 and a second fuse element 122 mounted on a glass epoxy substrate 123. The first fuse element 121 includes the first fuse part 55a, the second fuse part 55b, the third fuse part 55c, and the first heater part 57. The second fuse element 122 includes the fourth fuse part 56*a*, the fifth fuse part 56*b*, the sixth fuse part 56*c*, and the second heater part 58.

On the glass epoxy substrate 123, six coil connection bus bars 124*a* to 124*f*, two power source bus bars 125*a* and 125*b*, and two signal bus bars 126*a* and 126*b* are mounted.

The first coil connection bus bar 124*a* is welded to the first u-phase coil 131*a*. The second coil connection bus bar 124*b* is welded to the first v-phase coil 131*b*. The third coil connection bus bar 124*c* is welded to the first w-phase coil 131*c*. The fourth coil connection bus bar 124*d* is welded to the second u-phase coil 132*a*. The fifth coil connection bus bar 124*e* is welded to the second v-phase coil 132*b*. The sixth coil connection bus bar 124*f* is welded to the second w-phase coil 132*c*. The first power source bus bar 125*a* and the second power source bus bar 125*b* are connected to the fuse heating power source 37. The first signal bus bar 126*a* is connected to the FET 60. The second signal bus bar 126*b* is connected to the FET 62.

Next, actions and effects of the seventh embodiment are described.

In the seventh embodiment, the inverter 22 is formed of two units, specifically, the first inverter unit 221 and the second inverter unit 222. Thus, even when an abnormality occurs in one of the two inverter units 221 and 222, another inverter unit can continue the control of the drive of the motor 11.

In this case, when the inverter 22 is formed of a plurality of units such as the first inverter unit 221 and the second inverter unit 222, the fuse parts are provided for all of the u-phase, the v-phase, and the w-phase of each of the inverter units. In this manner, when one inverter unit fails, supply of power to this inverter unit can be completely interrupted. Thus, outflow to the one inverter unit of power to be supplied to another inverter unit can be suppressed.

Other Embodiments

The embodiments for carrying out the present invention have been described above. However, the specific configuration of the present invention is not limited to the configurations described in the embodiments. A change in design without departing from the scope of the gist of the invention is encompassed in the present invention.

The connection circuit for connecting the inverter and the stator coil to each other may be an electric wire extending from the stator coil, a wiring line provided on a circuit board, or other power supply wiring lines.

The motor drive device according to the present invention is applicable also to systems other than electric power steering, and actions and effects similar to those of the embodiments are provided.

Technical ideas obtained from the embodiments described above are described below.

In one mode, a motor drive device includes: a motor unit including a motor rotor and a stator coil, the stator coil including coils of a u-phase, a v-phase, and a w-phase; an inverter configured to control drive of the motor unit; a connection circuit configured to connect the inverter and the stator coil to each other; a heater-integrated fuse provided in the stator coil or the connection circuit, the heater-integrated fuse including a fuse part and a heater part configured to generate heat for cutting the fuse part; and a microcomputer including a motor drive command signal generation unit, a failure detection unit, and a heater control unit, the motor drive command signal generation unit being configured to generate a motor drive command signal for controlling drive of the inverter, the failure detection unit being configured to detect a short-circuit failure of the inverter, the heater control unit being configured to output, when the failure detection unit detects the short-circuit failure of the inverter, a heater energization command signal so that power is supplied to the heater part.

Preferably, in the mode described above, the u-phase, the v-phase, and the w-phase of the stator coil are connected to each other in star connection, and the heater-integrated fuse is connected to a neutral point of the stator coil.

In another preferred mode, in any one of the modes described above, the fuse part includes a first fuse part, a second fuse part, and a third fuse part. The first fuse part includes a first fuse part first end portion and a first fuse part second end portion which are a pair of end portions of the first fuse part. The first fuse part first end portion is connected to the u-phase of the stator coil. The second fuse part includes a second fuse part first end portion and a second fuse part second end portion which are a pair of end portions of the second fuse part. The second fuse part first end portion is connected to the v-phase of the stator coil. The third fuse part includes a third fuse part first end portion and a third fuse part second end portion which are a pair of end portions of the third fuse part. The third fuse part first end portion is connected to the w-phase of the stator coil. The first fuse part second end portion, the second fuse part second end portion, and the third fuse part second end portion are connected to each other. The heater part is configured to cut the first fuse part, the second fuse part, and the third fuse part through heat generation of the heater part.

In still another preferred mode, in any one of the modes described above, the connection circuit is three conductive wires extending from the stator coil in a direction of a rotation axis of the motor rotor, and the fuse part is provided on the three conductive wires.

In still another preferred mode, in any one of the modes described above, the fuse part includes a first fuse part, a second fuse part, and a third fuse part. The first fuse part, the second fuse part, and the third fuse part are connected to the three conductive wires, respectively. The heater part is configured to cut the first fuse part, the second fuse part, and the third fuse part through heat generation of the heater part.

In still another preferred mode, in any one of the modes described above, the fuse part includes a first fuse part, a second fuse part, and a third fuse part. The connection circuit includes a u-phase conductive wire connected to the u-phase in the stator coil, a v-phase conductive wire connected to the v-phase, and a w-phase conductive wire connected to the w-phase. The first fuse part is connected in series to the u-phase conductive wire. The second fuse part is connected in series to the v-phase conductive wire. The third fuse part is connected in series to the w-phase conductive wire. The heater part is configured to cut the first fuse part, the second fuse part, and the third fuse part through heat generation of the heater part.

In still another preferred mode, in any one of the modes described above, the microcomputer, the connection circuit, and the motor unit are arranged in series to each other in the stated order in the direction of the rotation axis of the motor rotor.

In still another preferred mode, in any one of the modes described above, the inverter includes: a first transistor and a second transistor which are connected to the u-phase of the stator coil, and are connected in series to each other; a third transistor and a fourth transistor which are connected to the v-phase of the stator coil, and are connected in series to each other; and a fifth transistor and a sixth transistor which are connected to the w-phase of the stator coil, and are connected in series to each other. The u-phase, the v-phase, and the w-phase of the stator coil are connected to each other in star connection. The failure detection unit is configured to detect the short-circuit failure of the inverter based on a change in a voltage at a neutral point of the stator coil.

In still another preferred mode, in any one of the modes described above, the failure detection unit is configured to detect the short-circuit failure of the inverter based on a change in a current of each of the u-phase, the v-phase, and the w-phase of the stator coil.

In still another preferred mode, in any one of the modes described above, the failure detection unit is configured to detect the short-circuit failure of the inverter when a current value of each of the u-phase, the v-phase, and the w-phase of the stator coil is equal to or larger than a predetermined value.

In still another preferred mode, in any one of the modes described above, the motor drive device further includes an inverter switching control unit. The inverter includes a first inverter unit and a second inverter unit. The first inverter unit is configured to control drive of the motor unit based on a motor drive command signal input to the first inverter unit. The second inverter unit is configured to control drive of the motor unit based on a motor drive command signal input to the second inverter unit. The inverter switching control unit is configured to selectively output the motor drive command signal to the first inverter unit and the second inverter unit. The microcomputer further includes an inverter switching control signal generation unit. The inverter switching control signal generation unit is configured to generate an inverter switching control signal to be output to the inverter switching control unit. The inverter switching control signal is a signal including information on whether to output the motor drive command signal to the first inverter unit and whether to output the motor drive command signal to the second inverter unit in the inverter switching control unit.

In still another preferred mode, in any one of the modes described above, the stator coil includes a first stator coil and a second stator coil. The first stator coil includes coils of a first u-phase, a first v-phase, and a first w-phase. The second stator coil includes coils of a second u-phase, a second v-phase, and a second w-phase. The fuse part includes a first fuse part, a second fuse part, a third fuse part, a fourth fuse part, a fifth fuse part, and a sixth fuse part. The connection circuit includes a first u-phase conductive wire connected to the first u-phase in the stator coil, a first v-phase conductive wire connected to the first v-phase, a first w-phase conductive wire connected to the first w-phase, a second u-phase conductive wire connected to the second u-phase, a second v-phase conductive wire connected to the second v-phase, and a second w-phase conductive wire connected to the second w-phase. The first fuse part is provided in a first u-phase conductive circuit including the first u-phase conductive wire and the first u-phase of the first stator coil. The second fuse part is provided in a first v-phase conductive circuit including the first v-phase conductive wire and the first v-phase of the first stator coil. The third fuse part is provided in a first w-phase conductive circuit including the first w-phase conductive wire and the first w-phase of the first stator coil. The fourth fuse part is provided in a second u-phase conductive circuit including the second u-phase conductive wire and the second u-phase of the second stator coil. The fifth fuse part is provided in a second v-phase conductive circuit including the second v-phase conductive wire and the second v-phase of the second stator coil. The sixth fuse part is provided in a second w-phase conductive circuit including the second w-phase conductive wire and the second w-phase of the second stator coil.

In still another preferred mode, in any one of the modes described above, the fuse part includes a first fuse part and a second fuse part. The connection circuit includes a u-phase conductive wire connected to the u-phase in the stator coil, a v-phase conductive wire connected to the v-phase, and a w-phase conductive wire connected to the w-phase. The first fuse part is provided in a first conductive circuit which is one of a u-phase conductive circuit including the u-phase conductive wire and the u-phase of the stator coil, a v-phase conductive circuit including the v-phase conductive wire and the v-phase of the stator coil, or a w-phase conductive circuit including the w-phase conductive wire and the w-phase of the stator coil. The second fuse part is provided in a second conductive circuit which is another one of the u-phase conductive circuit including the u-phase conductive wire and the u-phase of the stator coil, the v-phase conductive circuit including the v-phase conductive wire and the v-phase of the stator coil, or the w-phase conductive circuit including the w-phase conductive wire and the w-phase of the stator coil, which is different from the first conductive circuit.

In still another preferred mode, in any one of the modes described above, the motor drive device further includes a glass epoxy substrate, and the heater-integrated fuse is mounted on the glass epoxy substrate.

In still another preferred mode, in any one of the modes described above, the heater control unit is configured to supply, when an atmospheric temperature at a location at which the microcomputer is provided is lower than a predetermined temperature, power to the heater part within a range in which the fuse part is not cut, to thereby perform pre-heat control of heating the heater part.

In still another preferred mode, in any one of the modes described above, the heater control unit is configured to: output, when the failure detection unit detects the short-circuit failure of the inverter and when an atmospheric temperature at a location at which the microcomputer is provided is equal to or higher than a predetermined temperature, a first heater energization command signal so that first power is supplied to the heater part; and output, when the atmospheric temperature is lower than the predetermined temperature, a second heater energization command signal so that second power larger than the first power is supplied to the heater part.

In still another preferred mode, in any one of the modes described above, the motor drive device further includes a power source relay. The power source relay is provided between the inverter and a battery configured to supply power to the motor unit. The microcomputer further includes a power source relay control unit. The power source relay control unit is configured to switch, after the heater control unit outputs the heater energization command signal, the power source relay to an interruption state so that conduction between the battery and the inverter is interrupted.

In still another preferred mode, in any one of the modes described above, the motor drive device further includes a power source relay and a heater power supply unit. The power source relay is provided between the inverter and a battery configured to supply power to the motor unit. The microcomputer further includes a power source relay control unit. The power source relay control unit is configured to switch the power source relay to an interruption state so that conduction between the battery and the inverter is interrupted. The heater power supply unit connects the heater part and a part between the battery and the power source relay to each other, and is configured to supply power from the battery to the heater part.

Note that, the present invention is not limited to the above-mentioned embodiments, and includes further various modification examples. For example, in the above-mentioned embodiments, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, and replace a part of the configuration of each of the embodiments.

The present application claims a priority based on Japanese Patent Application No. 2020-014868 filed on Jan. 31, 2020. All disclosed contents including Specification, Scope of Claims, Drawings, and Abstract of Japanese Patent Application No. 2020-014868 filed on Jan. 31, 2020 are incorporated herein by reference in their entirety.

REFERENCE SIGNS LIST

11 motor (motor unit), 12 motor rotor, 13 stator coil, 20 microcomputer, 201 motor drive command signal generation unit, 20b failure detection unit, 20c heater control unit, 22 inverter, 30 connection circuit, 31 heater-integrated fuse, 32 fuse part, 33 heater part

The invention claimed is:

1. A motor drive device, comprising:
    a motor unit including a motor rotor and a stator coil, the stator coil including coils of a u-phase, a v-phase, and a w-phase;
    an inverter configured to control drive of the motor unit;
    a connection circuit configured to connect the inverter and the stator coil to each other;
    a heater-integrated fuse provided in the stator coil or the connection circuit,
       the heater-integrated fuse including a fuse part and a heater part configured to generate heat for cutting the fuse part; and
    a microcomputer including a motor drive command signal generation unit, a failure detection unit, and a heater control unit,
       the motor drive command signal generation unit being configured to generate a motor drive command signal for controlling drive of the inverter,
       the failure detection unit being configured to detect a short-circuit failure of the inverter,
       the heater control unit being configured to output, when the failure detection unit detects the short-circuit failure of the inverter, a heater energization command signal so that power is supplied to the heater part,
    wherein the u-phase, the v-phase, and the w-phase of the stator coil are connected to each other in star connection, and
    wherein the heater-integrated fuse is connected to a neutral point of the stator coil.

2. The motor drive device according to claim 1,
    wherein the fuse part includes a first fuse part, a second fuse part, and a third fuse part,
    wherein the first fuse part includes a first fuse part first end portion and a first fuse part second end portion which are a pair of end portions of the first fuse part,
    wherein the first fuse part first end portion is connected to the u-phase of the stator coil,
    wherein the second fuse part includes a second fuse part first end portion and a second fuse part second end portion which are a pair of end portions of the second fuse part,
    wherein the second fuse part first end portion is connected to the v-phase of the stator coil,
    wherein the third fuse part includes a third fuse part first end portion and a third fuse part second end portion which are a pair of end portions of the third fuse part,
    wherein the third fuse part first end portion is connected to the w-phase of the stator coil,
    wherein the first fuse part second end portion, the second fuse part second end portion, and the third fuse part second end portion are connected to each other, and
    wherein the heater part is configured to cut the first fuse part, the second fuse part, and the third fuse part through heat generation of the heater part.

3. The motor drive device according to claim 1,
    wherein the connection circuit is three conductive wires extending from the stator coil in a direction of a rotation axis of the motor rotor, and
    wherein the fuse part is provided on the three conductive wires.

4. The motor drive device according to claim 3,
    wherein the fuse part includes a first fuse part, a second fuse part, and a third fuse part,
    wherein the first fuse part, the second fuse part, and the third fuse part are connected to the three conductive wires, respectively, and
    wherein the heater part is configured to cut the first fuse part, the second fuse part, and the third fuse part through heat generation of the heater part.

5. The motor drive device according to claim 3,
    wherein the fuse part includes a first fuse part, a second fuse part, and a third fuse part,
    wherein the connection circuit includes a u-phase conductive wire connected to the u-phase in the stator coil, a v-phase conductive wire connected to the v-phase, and a w-phase conductive wire connected to the w-phase,
    wherein the first fuse part is connected in series to the u-phase conductive wire,
    wherein the second fuse part is connected in series to the v-phase conductive wire,
    wherein the third fuse part is connected in series to the w-phase conductive wire, and
    wherein the heater part is configured to cut the first fuse part, the second fuse part, and the third fuse part through heat generation of the heater part.

6. The motor drive device according to claim 3, wherein the microcomputer, the connection circuit, and the motor unit are arranged in series to each other in the stated order in the direction of the rotation axis of the motor rotor.

7. The motor drive device according to claim 1,
    wherein the inverter includes:
        a first transistor and a second transistor which are connected to the u-phase of the stator coil, and are connected in series to each other;
        a third transistor and a fourth transistor which are connected to the v-phase of the stator coil, and are connected in series to each other; and
        a fifth transistor and a sixth transistor which are connected to the w-phase of the stator coil, and are connected in series to each other, wherein the failure detection unit is configured to detect the short-circuit failure of the inverter based on a change in a voltage at a neutral point of the stator coil.

8. The motor drive device according to claim 1, wherein the failure detection unit is configured to detect the short-circuit failure of the inverter based on a change in a current of each of the u-phase, the v-phase, and the w-phase of the stator coil.

9. The motor drive device according to claim 8, wherein the failure detection unit is configured to detect the short-circuit failure of the inverter when a current value of each of the u-phase, the v-phase, and the w-phase of the stator coil is equal to or larger than a predetermined value.

10. The motor drive device according to claim 1, further comprising an inverter switching control unit,
   wherein the inverter includes a first inverter unit and a second inverter unit,
   wherein the first inverter unit is configured to control drive of the motor unit based on a motor drive command signal input to the first inverter unit,
   wherein the second inverter unit is configured to control drive of the motor unit based on a motor drive command signal input to the second inverter unit,
   wherein the inverter switching control unit is configured to selectively output the motor drive command signal to the first inverter unit and the second inverter unit,
   wherein the microcomputer further includes an inverter switching control signal generation unit,
   wherein the inverter switching control signal generation unit is configured to generate an inverter switching control signal to be output to the inverter switching control unit, and
   wherein the inverter switching control signal is a signal including information on whether to output the motor drive command signal to the first inverter unit and whether to output the motor drive command signal to the second inverter unit in the inverter switching control unit.

11. The motor drive device according to claim 10,
   wherein the stator coil includes a first stator coil and a second stator coil,
   wherein the first stator coil includes coils of a first u-phase, a first v-phase, and a first w-phase,
   wherein the second stator coil includes coils of a second u-phase, a second v-phase, and a second w-phase,
   wherein the fuse part includes a first fuse part, a second fuse part, a third fuse part, a fourth fuse part, a fifth fuse part, and a sixth fuse part,
   wherein the connection circuit includes a first u-phase conductive wire connected to the first u-phase in the stator coil, a first v-phase conductive wire connected to the first v-phase, a first w-phase conductive wire connected to the first w-phase, a second u-phase conductive wire connected to the second u-phase, a second v-phase conductive wire connected to the second v-phase, and a second w-phase conductive wire connected to the second w-phase,
   wherein the first fuse part is provided in a first u-phase conductive circuit including the first u-phase conductive wire and the first u-phase of the first stator coil,
   wherein the second fuse part is provided in a first v-phase conductive circuit including the first v-phase conductive wire and the first v-phase of the first stator coil,
   wherein the third fuse part is provided in a first w-phase conductive circuit including the first w-phase conductive wire and the first w-phase of the first stator coil,
   wherein the fourth fuse part is provided in a second u-phase conductive circuit including the second u-phase conductive wire and the second u-phase of the second stator coil,
   wherein the fifth fuse part is provided in a second v-phase conductive circuit including the second v-phase conductive wire and the second v-phase of the second stator coil, and
   wherein the sixth fuse part is provided in a second w-phase conductive circuit including the second w-phase conductive wire and the second w-phase of the second stator coil.

12. The motor drive device according to claim 1,
   wherein the fuse part includes a first fuse part and a second fuse part,
   wherein the connection circuit includes a u-phase conductive wire connected to the u-phase in the stator coil, a v-phase conductive wire connected to the v-phase, and a w-phase conductive wire connected to the w-phase,
   wherein the first fuse part is provided in a first conductive circuit which is one of a u-phase conductive circuit including the u-phase conductive wire and the u-phase of the stator coil, a v-phase conductive circuit including the v-phase conductive wire and the v-phase of the stator coil, or a w-phase conductive circuit including the w-phase conductive wire and the w-phase of the stator coil, and
   wherein the second fuse part is provided in a second conductive circuit which is another one of the u-phase conductive circuit including the u-phase conductive wire and the u-phase of the stator coil, the v-phase conductive circuit including the v-phase conductive wire and the v-phase of the stator coil, or the w-phase conductive circuit including the w-phase conductive wire and the w-phase of the stator coil, which is different from the first conductive circuit.

13. The motor drive device according to claim 1, further comprising a glass epoxy substrate,
   wherein the heater-integrated fuse is mounted on the glass epoxy substrate.

14. The motor drive device according to claim 1, wherein the heater control unit is configured to supply, when an atmospheric temperature at a location at which the microcomputer is provided is lower than a predetermined temperature, power to the heater part within a range in which the fuse part is not cut, to thereby perform pre-heat control of heating the heater part.

15. The motor drive device according to claim 1, wherein the heater control unit is configured to:
   output, when the failure detection unit detects the short-circuit failure of the inverter and when an atmospheric temperature at a location at which the microcomputer is provided is equal to or higher than a predetermined temperature, a first heater energization command signal so that first power is supplied to the heater part; and
   output, when the atmospheric temperature is lower than the predetermined temperature, a second heater energization command signal so that second power larger than the first power is supplied to the heater part.

16. The motor drive device according to claim 1, further comprising a power source relay,
   wherein the power source relay is provided between the inverter and a battery configured to supply power to the motor unit,
   wherein the microcomputer further includes a power source relay control unit, and wherein the power source relay control unit is configured to switch, after the heater control unit outputs the heater energization command signal, the power source relay to an interruption state so that conduction between the battery and the inverter is interrupted.

17. The motor drive device according to claim 1, further comprising a power source relay and a heater power supply unit, wherein the power source relay is provided between the inverter and a battery configured to supply power to the motor unit, wherein the microcomputer further includes a power source relay control unit, wherein the power source relay control unit is configured to switch the power source relay to an interruption state so that conduction between the battery and the inverter is interrupted, and wherein the heater power supply unit connects the heater part and a part between the battery and the power source relay to each other, and is configured to supply power from the battery to the heater part.

* * * * *